United States Patent
Petersen

Patent Number: 6,035,516
Date of Patent: Mar. 14, 2000

[54] SECUREMENT OF HEAD REST SUPPORT INTO AUTOMOBILE SEAT FRAME

[75] Inventor: Horst Udo Petersen, Kitchener, Canada

[73] Assignee: Bend All Manufacturing Inc., Ayr, Canada

[21] Appl. No.: 09/064,620

[22] Filed: Apr. 23, 1998

[51] Int. Cl.[7] .................................................. B21D 39/00
[52] U.S. Cl. .............................. 29/523; 29/505; 29/509; 29/515; 297/452.18
[58] Field of Search .......................... 29/505, 509, 523, 29/520, 515, 243.517, 243.5, 282, 283.5; 297/452.18, 391, 410

[56] References Cited

U.S. PATENT DOCUMENTS

| | | | |
|---|---|---|---|
| 3,286,539 | 11/1966 | Loper et al. ................................ | 29/509 |
| 3,327,385 | 6/1967 | Shaver ....................................... | 29/523 |
| 4,519,650 | 5/1985 | Terada et al. ............................. | 297/410 |
| 4,656,721 | 4/1987 | Werner ...................................... | 29/523 |
| 4,698,968 | 10/1987 | Osterwald et al. ....................... | 29/513 |
| 5,092,634 | 3/1992 | Miller ........................................ | 29/523 |
| 5,367,759 | 11/1994 | Loew et al. ............................... | 29/523 |
| 5,749,135 | 5/1998 | Crane et al. .............................. | 29/415 |
| 5,769,499 | 6/1998 | Dudash et al. ...................... | 297/452.18 |

FOREIGN PATENT DOCUMENTS 405123783  5/1993  Japan ....................... 29/282

*Primary Examiner*—David P. Bryant
*Assistant Examiner*—Jermie E. Cozart
*Attorney, Agent, or Firm*—Anthony Asquith & Co.

[57] ABSTRACT

The headrest support tubes are secured to the seat frame member not by the usual welding, but by gripping the web of the member between two rings or lock-beads swaged into the metal of the tube. The first ring is swaged-out by compressing the tube. The tube, with the one ring, is then assembled into a through-hole in the web of the frame member. Then, the second ring is swaged into the metal of the tube, on the other side of the web, and the web lies gripped between the rings. The seat frame member may be an I-section extrusion, or a round tube with localised squeezed-flat areas, flanked by flanges.

9 Claims, 6 Drawing Sheets

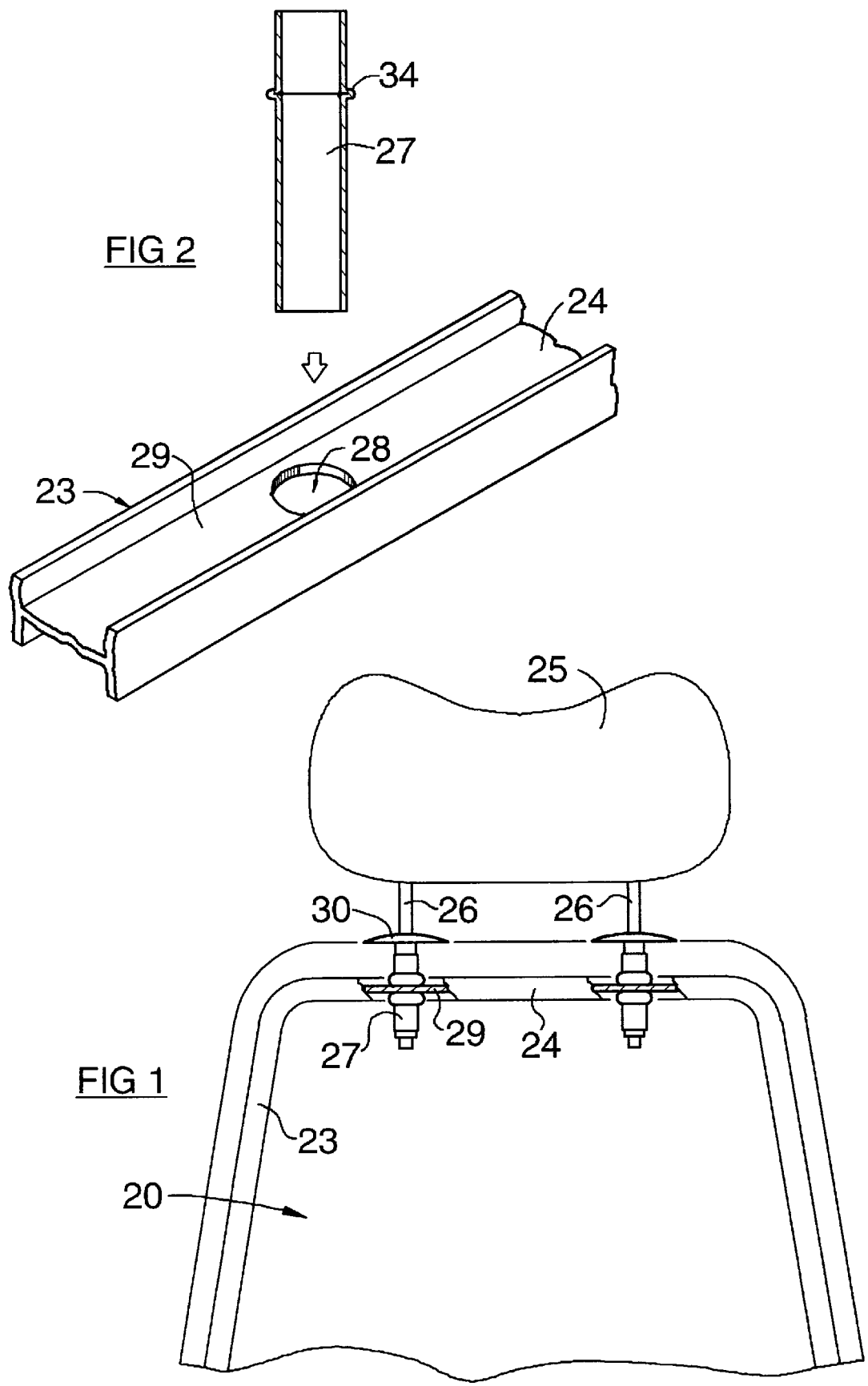

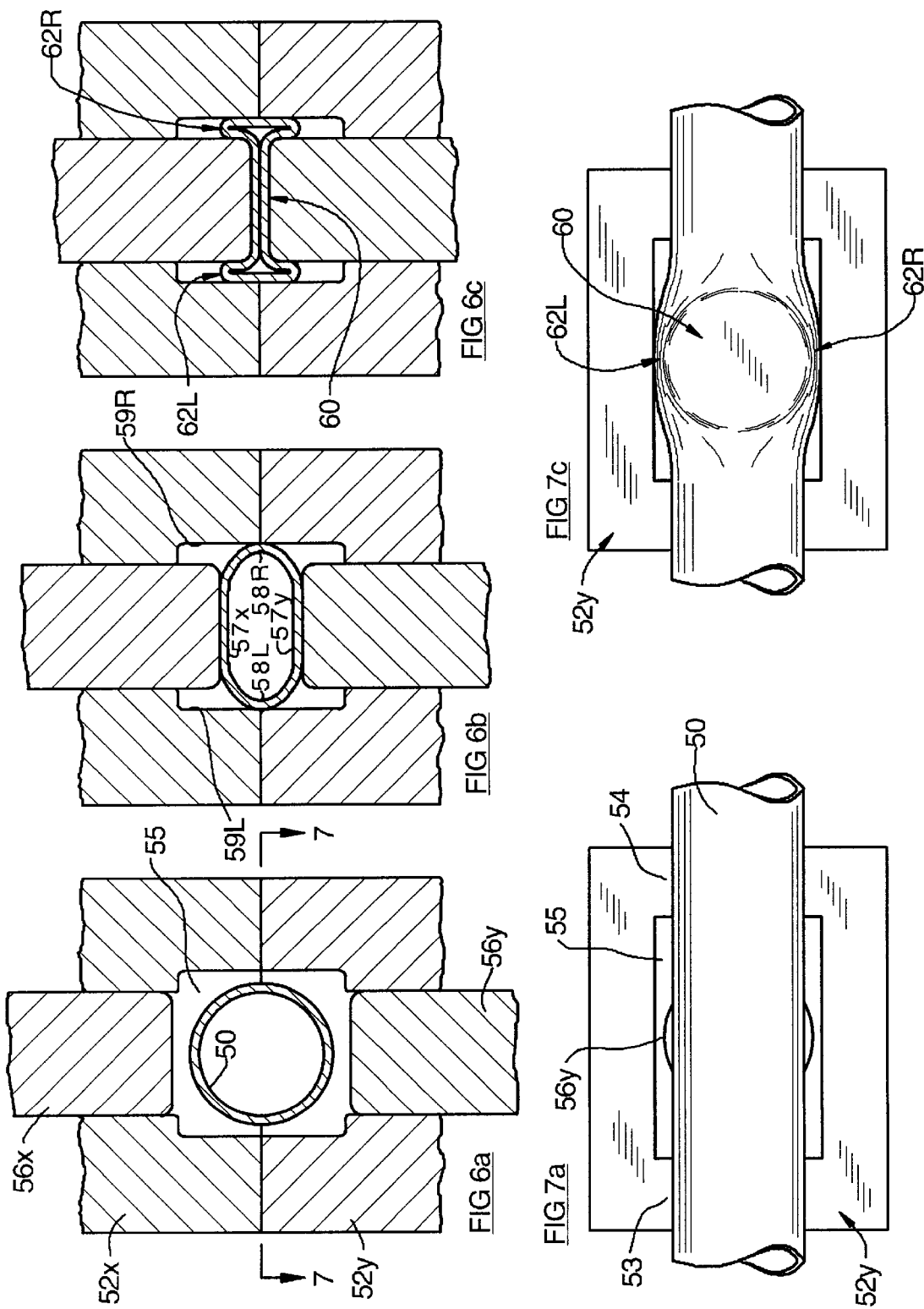

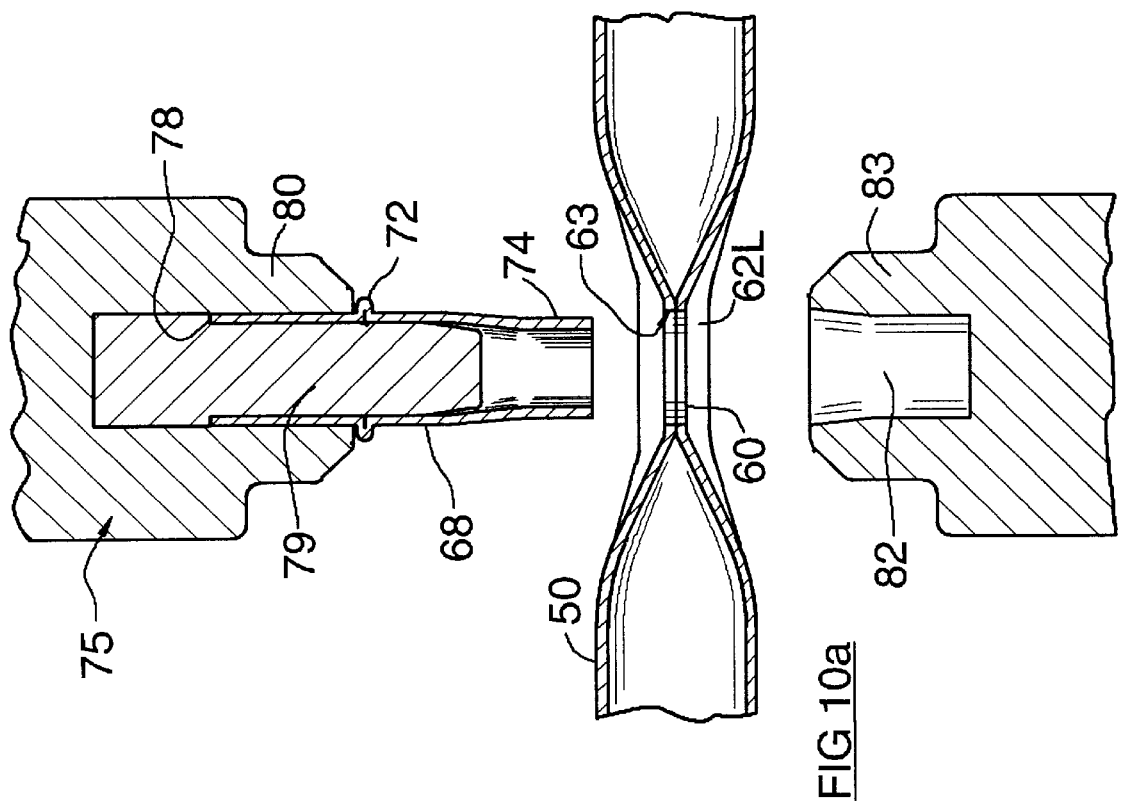
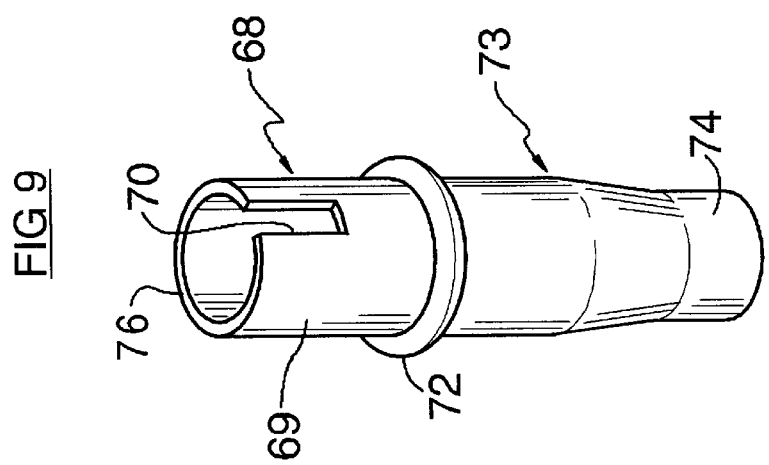

SECUREMENT OF HEAD REST SUPPORT INTO AUTOMOBILE SEAT FRAME

This invention relates to the construction of automobile seats, and is directed particularly to the manner of attachment of a headrest to the frame of an automobile seat.

BACKGROUND TO THE INVENTION

The headrest on an automobile seat is often made adjustable as to height. One common way in which the headrest is mounted on the seat in a way that permits height adjustment is for the headrest to be provided with two downwardly extending pegs, and the pegs engage sockets secured into the frame of the seat. Detent means are usually provided which interact between the pegs and the sockets, whereby the headrest may be set, by the occupant of the vehicle, at one of a number of pre-set heights.

The socket in which the peg is received comprises a metal tube. A plastic liner may be provided in the tube, to act as a bearing material for the peg. In the conventional system, the tube is welded to a bracket, and the bracket is welded to a frame piece of the seat. This manner of attachment, though secure enough (because it has to be secure by regulation), unfortunately is expensive as to the labour time and the materials needed to make it that secure. Any securement system that involves welding tends to be labour-intensive and therefore expensive, besides being difficult to inspect and test. A welded system generally has to be over-engineered.

Also, welding does not lead to high accuracy. The need for accuracy of placement of the headrest on the seat is not high, although the accuracy of the spacing of the pegs and their sockets cannot be too far out; the conventional welded-on system is just about at the limit for accuracy for welding, which means that, when welding is used as the basis of the attachment method, skilled care has to be taken, which in turn does nothing to ease the cost problem.

The invention is aimed at providing a manner of securing a headrest support tube into a seat frame, in a manner that eases some of the compromises that have had to be resorted to in the conventional systems.

Typically, the operations carried out in a conventional seat manufactory include welding, bending of frame pieces, securing components together, and assembly, all of which tend to have a higher labour content. It is an aim of the headrest support system as described herein, to minimise the labour content of the task of attaching the support tubes to the seat frame piece.

Support tubes for headrests are conventionally attached to the seat frame piece by welding a bracket onto the frame piece, and then welding the tube to the bracket. Sometimes, the tube is pressed into holes in the welded-on bracket; but welding is nearly always resorted to, to assure that the tube remains in position on the bracket. Of course, the tubes can be attached securely enough, but the conventional costs of ensuring that security are high.

GENERAL FEATURES OF THE INVENTION

The invention lies in the manner of attaching the headrest-support-tube. First, the headrest-support-tube is provided with a first ring, in which the metal of the headrest-support-tube is expanded radially outwards. The headrest-support-tube is assembled into a hole in the web of the seat-frame-piece, with the first ring abutting against the web.

The frame-piece, with the headrest-support-tube resting therein, is placed in the die of a punch and die set, with the first ring in the die. The punch then is brought down over the other end of the headrest-support-tube, and a second ring is formed on the other side of the web. When the punch is withdrawn, the web lies gripped between the two rings. Usually, another headrest-support-tube is inserted into the frame-piece, in a similar manner. Then, the seat-frame piece is assembled into a seat, and finally the pegs of the headrest are inserted into the headrest-support-tubes.

THE PRIOR ART

As mentioned, headrest-support tubes are attached to the seat-frame-piece by welding. Sometimes, designers have specified intermediate brackets, rather than just welding the tube to the frame piece.

Techniques for mounting a tube into a through-hole in a piece of sheet metal are commonplace, per se. The broad range of options available include bulk-head fittings generally. Such fittings have included cases where a first bead is provided on the tube on one side of the sheet, then a second bead is swaged into the tube after the tube has been inserted into the through-hole. The technique is commonly known as lock-beading.

In cases where bulk-head fittings are being designed, a common requirement is that the fitting be air- or liquid-tight. It is recognised that the lock-beading technique is not suitable for such cases. It is recognised that lock-beading is highly suitable for cases where mechanical integrity is paramount, rather than sealing. It is also recognised that lock-beading is highly suitable for cases where access to the beads is only to be had from an axial direction, such as a case where flat-access to the through-hole is denied because the through-hole is surrounded by raised flanges.

DETAILED DESCRIPTION OF PREFERRED EMBODIMENTS

By way of further explanation of the invention, exemplary embodiments of the invention will now be described with reference to the accompanying drawings, in which:

FIG. 1 is a diagram of an automobile seat frame, shown partly in cross-section, carrying a headrest which is mounted in a manner in accordance with the invention;

FIG. 2 is a view of some of the components that support the headrest, shown at a preliminary stage of manufacture;

FIGS. 6a, 6b, 6c are cross-sections of a tooling arrangement for forming a metal tube locally into an I-section beam;

FIGS. 7a, 7c are views on the line 7—7 of FIG. 6a, corresponding to the conditions shown in FIGS. 6a and 6c respectively;

FIG. 9 is a view of a headrest-support-tube, shown prior to final forming;

FIGS. 10a, 10b, 10c are cross-sections of a tooling arrangement for ring-bead-locking the headrest-support-tube of FIG. 9 into the through-hole in the web of the I-beam.

Figure 3:
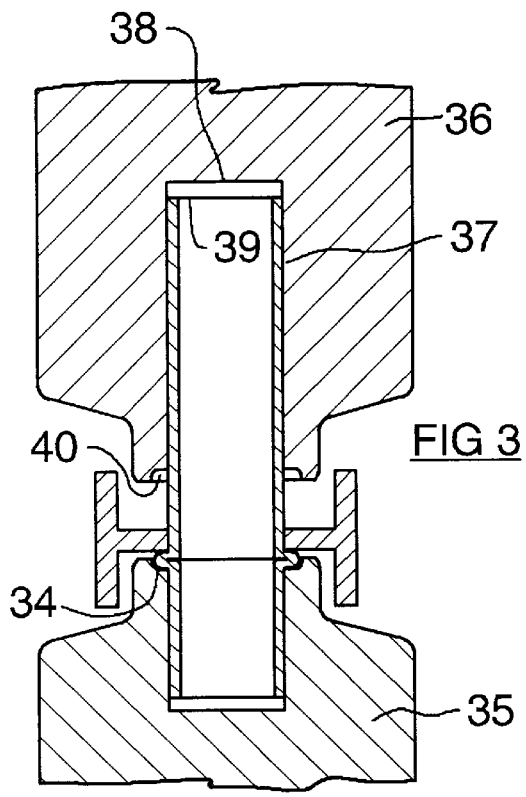
FIG. 3 is a view of a punch and die set-up, which is used at a stage in the manufacture of one of the headrest supports.

The apparatuses shown in the accompanying drawings and described below are examples which embody the invention. It should be noted that the scope of the invention is defined by the accompanying claims, and not necessarily by specific features of exemplary embodiments.

FIG. 1 shows an automobile seat 20, having a seat frame piece 23. In this case, the seat frame piece 23 made from a length of extruded I-section aluminum. The seat frame piece is bent generally into an inverted U-shape, as shown, in which the horizontal rail 24 of the U-shape forms the horizontal top rail of the seat.

The headrest 25 of the seat 20 is formed with two pegs 26, which protrude downwards, as shown. The pegs engage into support tubes 27, which are integral with the frame of the seat. The support tubes 27 are fixed firmly to the horizontal rail 24, and in fact the support tubes pass through holes 28 in the web 29 of the I-section that forms the rail 24 (see FIG. 2).

The invention is concerned with the manner of attaching the support tubes 27 into the holes 28 in the web 29 of the I-section. Usually, headrests are adjustable as to vertical position, and the adjustment is effected by moving the headrest, with its two pegs 26, vertically up or down within the tubes 27.

Figure 5:
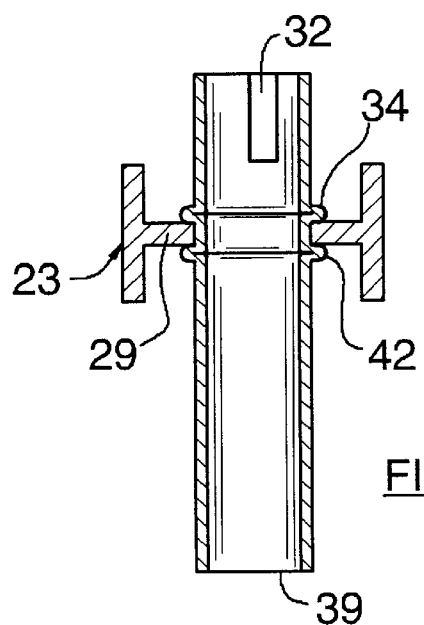
FIG. 5 is a cross-section of the headrest mounting support, shown at a later stage.

The designer can provide a plastic sleeve 30, which is inserted into the support tube to provide a bearing for guiding the pegs for up/down adjustment movement. The designer can provide the pegs with detents (not shown), which interact with the plastic sleeves 30, or with the tubes 27, in order to define some vertical positions to which the headrest might be set. It is usually necessary to align the plastic sleeve orientationally with respect to the tube, and the plastic sleeve can be moulded with a tongue for engagement with a notch 32 (FIG. 5) in the tube, for this purpose.

In order to manufacture the seat frame, with the headrest support tubes 27 attached, first the tubes are formed with a single first swaged-out ring 34. The tube in this state is as shown in FIG. 2.

The swaged-out ring 34 is formed by pressing the ends of a plain length of tubing axially, and confining the walls thereof everywhere but at the place where the ring is to be formed. It may be noted that this first operation is carried out on the tube when only the tube itself is present, i.e in the absence of any other components. The operation of forming the first ring is of low labour content, and can be easily automated.

The job of attaching the tube 27, with its first swaged-out ring 34, into the hole 28 in the web 29 of the I-section, can also be fully automated, as can the job of swaging the first ring into the tube. This may be compared with the job of welding a bracket onto the frame piece, and then locating a tube into holes in the bracket, and then welding the tube to the bracket, in which the labour content is inevitably high.

FIG. 3 shows the tube 27, with its first swaged-out ring 34, resting in a die 35. The seat frame piece 23 has been placed over the tube 27, with the web 29 resting against the first ring 34. A punch 36 is advanced, and a hole 37 in the punch slides over the upper portion of the tube 27. When the end of the hole 38 bottoms against the end 39 of the tube 27, further movement of the punch causes the upper portion of the tube to be compressed. A recess 40 in the punch allows the metal of the tube to expand outwards, in response to the axial force, with the result that the action of the punch causes a second ring 42 to be formed in the tube.

Figure 4:
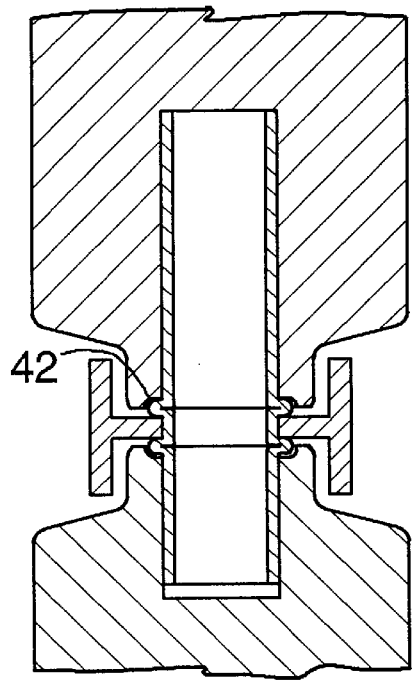
FIG. 4 is a view corresponding to FIG. 3 of another stage during manufacture.

FIG. 4 shows the situation when the punch and die are (almost) closed fully together. It will be seen from FIG. 4 that the web 29 is not contacted by either the die 35 or the punch 36 during the operation of swaging out the second ring 42. At the very end of the operation, the designer might provide that the web is in fact subjected to a squeeze between the punch and die, as a coining phase to ensure everything is straight; but in general, throughout the pressing stages indicated in FIGS. 3 and 4, the web 29 floats. As the pressing operation is nearing completion, the press forces also act on the first ring 34, and cause that to be consolidated and even coined.

The hole 28 in the frame piece is a clearance fit over the diameter of the tube 27, and so the frame-piece is not held in position, during the FIG. 4 operation, by being held by a tight fit on the tube 27. Therefore, the frame-piece 23 does need to be held—at least loosely—to prevent tipping thereof. However, that kind of holding is simple enough—at least when compared with securing the components in welding jigs.

It is important, during the FIG. 4 pressing operation, that the web 29 remain resting in close touching contact with the first ring 34. In an automated system, the designer should ensure that the components are presented properly to each other for the operation. Seat-frame-pieces can include bends and twists, and be of an awkward shape, but the designer can provide the holding-clamps etc to accommodate whatever shape the seat-frame-pieces are in. The designer can decide whether to insert the head-rest-support-tubes into the seat-frame-piece before or after the seat-frame-piece is bent and twisted to its final shape.

The designer should ensure that, whatever the configuration of the components, the web can and does rest properly (i.e in firm abutment) against the first ring during the operation of pressing the second ring: if there were to be some clearance between the web and the first ring during pressing, the final joint would be significantly less tight and secure. The ideal is that the web should be under some degree of residual compression after the punch and die have separated, even if only slightly, and that can only happen if the web remains cleanly in abutment against the first ring throughout the pressing operation.

In an alternative, the die and punch set may be arranged with a subsidiary actuable member, which loads the web tightly against the first ring while the forming of the second ring is taking place.

It is important also that the clearance between the hole 28 in the web and the diameter of the tube 27 be taken up during the pressing operation. The force that causes the metal of the tube to swell out to form the second ring 42, of course also causes the metal to swell out to fill the clearance at the hole 28. Generally, the filling of the hole 28 is so good that any crannies. etc caused by burrs or other malformations arising from the punching of the hole 28, are filled completely and tightly.

The manner as described above of attaching the headrest support tubes to the seat frame provides a very secure attachment, which is amply able to accommodate the forces and abusive forces encountered in automotive seating equipment. The material costs are somewhat reduced, and the labour costs are very much reduced, as compared with what has to be done in the conventional tasks of welding the tubes to the frames.

It is conventional for the frames of automobile seats to be made from steel tubing. The head-rest-support-posts can be attached into a tubular-steel seat-frame in the manner as will now be described.

FIGS. 6a, 6b, 6c are views directed axially along the length of the seat-frame-tube 50, and show three stages in the preparation of the seat-frame-tube. FIGS. 7a, 7c are views corresponding to FIGS. 6a, 6c in the direction of arrows 7—7 of FIG. 6a.

In FIG. 6a, the seat-frame-tube 50 has been gripped on its outside diameter between two dies 52x, 52y. The dies are dimensioned to grip the seat-frame-tube at two spaced locations 53, 54. The dies 52x, 52y are shaped so as not to directly grip the seat-frame-tube 50 in the recess 55 between the locations 53, 54.

Once the dies 52x, 52y are in contact, and the seat-frame-tube 50 is firmly held, the two formers 56x, 56y are advanced. At first, the seat-frame-tube 50 is flattened, as shown in FIG. 6b. As the upper and lower zones 57x, 57y of the tube walls are forced together, the left and right side-zones 58L, 58R are forced apart, and these zones of the walls come into contact with the sides 59L, 59R of the recess 55.

The formers 56x, 56y are advanced until they bottom against the two thicknesses of the wall-zones 57x, 57y, as shown in FIGS. 6c, 7c. The wall-zones 58L, 58R are formed to the shape as shown by virtue of their confinement by the sides 59L, 59R of the recess 55. It will be noted that this manner of forming the seat-frame-tube produces a localised shape which is similar to that of an I-beam. The web 60 of the I-beam shape is derived from the wall-zones 57x, 57y, and the flanges 62L, 62R of the I-beam are derived from the folded wall-zones 58L, 58R.

It is noted that the seat-frame-tube 50 is not simply squashed flat. The operations as described produce a configuration that is much stronger and more rigid than a flattened tube. The flanges 62L, 62R, being tall (i.e the height of the flanges is equal to several thicknesses of the walls of the tube), are crucial to the rigidity of the tube against bending forces, which of course is an important consideration in a seat frame.

Figure 8B:
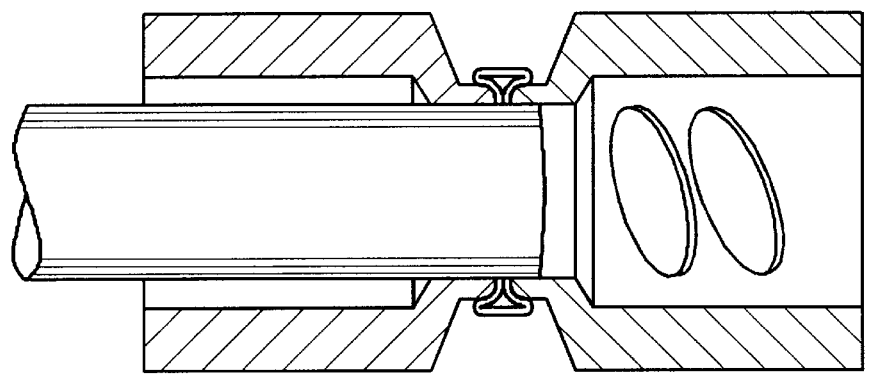
FIGS. 8a, 8b are cross-sections of a hole-punching arrangement, for making a through-hole in the web of the I-beam produced as in FIG. 6c.
Figure 8A:
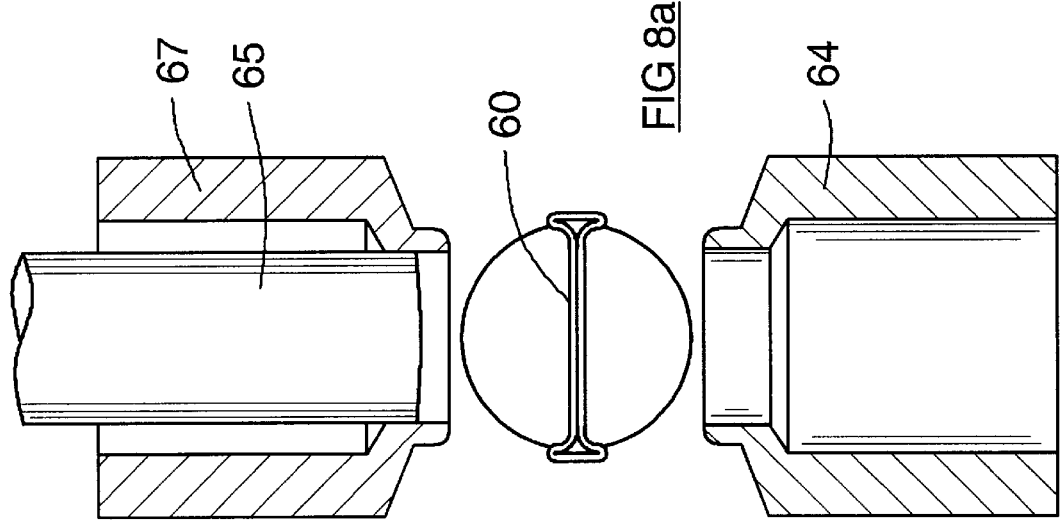

A hole 63 for receiving the head-rest-support-tube is punched in the web 60 of the seat-frame-tube, in the manner as shown in FIGS. 8a, 8b. A die-button 64 is brought into contact with one side of the web 60. A punch 65, carried in a stripper 67, is advanced, and pierces the hole 63 in the web. The die-button 64 and the stripper 67 are dimensioned to hold the web 60 to its desired shape during the disruption caused by the punching operation and subsequent stripping of the web from the punch 65.

The head-rest-support-tube 68 that is to be secured into the hole 63 in the web 60 is shown in FIG. 9. The head-rest-support-tube 68 is of steel, and includes an upper section 69, in which is cut a notch 70, a first ring-bead 72, and a lower section 73, the bottom section 74 of which is swaged down to a slightly smaller diameter than the rest of the head-rest-support-tube. The inside diameter of the bottom section 74 is dimensioned to be a tight location-fit on the peg 26 of the head-rest, and the reduced outside diameter of the bottom section 74 ensures an easy placement of the head-rest-support-tube 68 into the hole 63 in the web 60 of the seat-frame-tube 50.

Figure 10C:
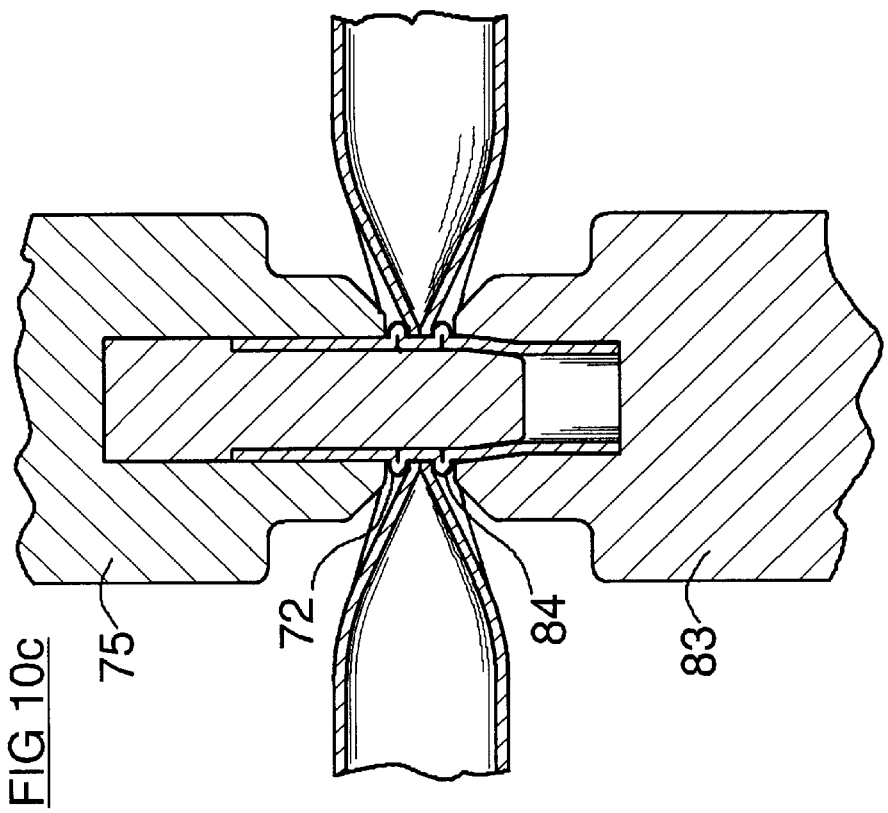
Figure 10B:
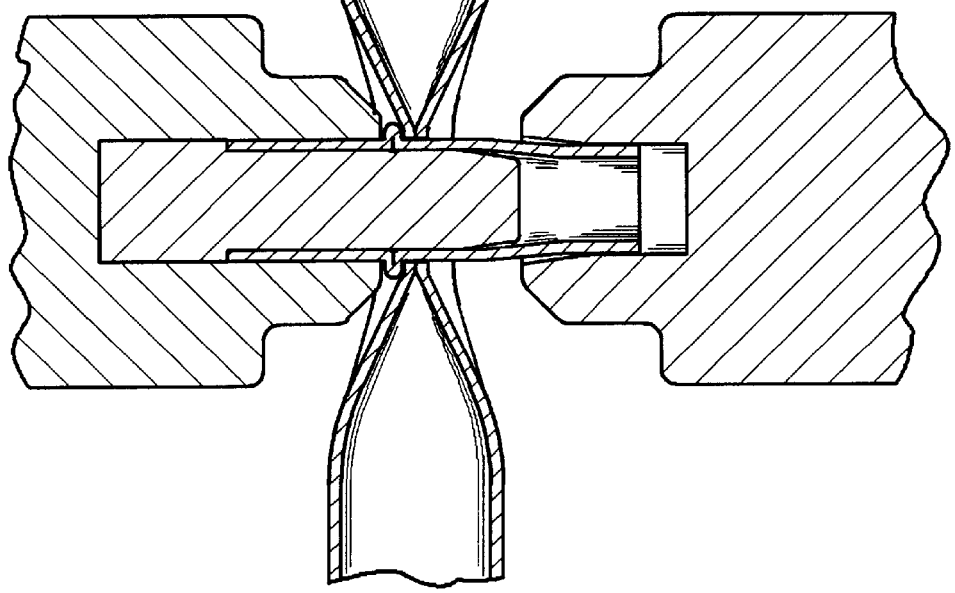

The manner of installing the head-rest-support-tube 68 into the hole 63 is illustrated in FIGS. 10a, 10b, 10c. The head-rest-support-tube is first positioned into a punch unit 75. The top end 76 of the head-rest-support-tube abuts against a shoulder 78 of the punch 79, and the already-formed first ring-bead 72 abuts against the bottom face of the punch-holder 80.

As shown in FIG. 10b, the head-rest-support-tube passes through the hole 63, and the tapered bottom end of the head-rest-support-tube enters the recess 82 in the die 83. As the punch 75 and die 83 approach, the bottom end of the head-rest-support-tube abuts against the bottom of the recess 82. From then on, further approaching movement of the punch and die are reacted as an axially-directed compressive force on the head-rest-support-tube. The compressive force is enough to cause the walls of the head-rest-support-tube to buckle outwards, whereby the second ring-bead 84 is formed. Approaching movement of the punch and die continues until the condition of FIG. 10c is reached.

The punch and die are then withdrawn, and the seat-frame-tube 50, with the head-rest-support-tube 68 now firmly attached, can be transferred to the next stage in the manufacture of the seat.

The manner of attaching the head-rest-support-tube into the seat-frame-tube ensures that the web 60 is structurally unitary with the head-rest-support-tube. The first and second ring-beads 72, 84 grip the web between them, providing a secure base for resisting abusive forces from any direction, which might tend to disrupt the attachment.

By forcing the punch unit 75 and the die 83 hard together (FIG. 10c) the amount of spring-back upon release can be made very small, whereby the compressive grip on the web is still firmly present upon release.

The head-rest-support-tube might be subjected to forces tending to rotate it, during use of the automobile, and it is important that rotation forces are resisted. If rotation of the head-rest-support-tube were to be permitted, the movement might cause the attachment to rattle or work loose. Accordingly, the designer might prefer to make the hole 63 in the web slightly non-circular. In fact, given the fact that the hole occupies a large area of the tube, it is all too easy for the hole 63 to be non-circular in any event. The operation of forming the second ring-bead 84, however, ensures that the head-rest-support-tube adapts itself completely to whatever out-of-roundness there might be in the hole 63, which helps to ensure freedom from rotation of the head-rest-support-tube.

The attachment system as described is very strong, as compared with the conventional welded construction, but apart from that clear advantage, the attachment system provides excellent and repeatable accuracy. Now that accuracy of alignment of the two head-rest-support-tubes can be relied upon, the design of the head-rest detents can be free of the compromises needed with the conventional welded attachment; designing a detent is a matter of making sure the force to move the head-rest pegs against the detent is neither too light nor too heavy, and the more accurately the components can be positioned, the easier it is to ensure the correct force.

Not only is the attachment system as described very strong, and accurate, but the system also lends itself to full automation. The attachment system is in keeping with the kinds of operations that have to be carried out on seat-frame-tubes, such as bending, piercing, etc, and the machinery for automating such operations is already commonplace. The similarity of those frame-tube operations with the operations required in the attachment system will be clear: the dissimilarity of the frame-tube operations with the conventional welding attachment system, is even more clear.

"The expressions upper, lower, horizontal, vertical, etc, as used in this specification, should not be interpreted to mean that the invention only applies when the actual physical components used in operating the invention are orientated in only that way. Rather, the expressions should be taken as referring to those directions when the components are represented on paper, which is oriented accordingly."

We claim:

1. Procedure for attaching a headrest-support-tube into a top rail of an automobile seat, wherein the top rail includes a seat-tube comprising a length of hollow metal tubing, and the procedure includes the following steps:

providing a punch and die set, and securing the seat-tube therein, oriented in a horizontal sense;

wherein the punch and die set includes formers, which are so shaped that, when the punch and die are brought together in a vertical direction, the formers squeeze opposed upper and lower portions of the seat-tube wall together, to form a walls-touching-area of the seat-tube;

wherein the formers are so shaped that, when the punch and die are brought together in a vertical direction, left and right side-zones of the seat-tube walls remain clear of the former in the vertical sense, and the left and right side-zones of the seat-tube wall are thereby not squeezed together in the vertical sense, but are left substantially upstanding;

whereby the configuration of the upstanding left and right side-zones of the seat-tube wall, in relation to the walls-touching-area of the seat-tube wall, is that of two side-flanges with a web straddling therebetween;

after the upper and lower portions of the seat-tube wall have been squeezed together, over the walls-touching-area of the seat-tube, then punching a hole right through the walls-touching-area, the through-hole being through both the upper and lower zones of the seat-tube wall;

providing the headrest-support-tube with a first ring-bead, in which the metal of the headrest-support-tube is expanded radially outwards;

after the through-hole has been punched through the walls-touching-area, then placing the headrest-support-tube in the said through-hole, and locating the headrest-support-tube in the through-hole in the seat-tube that the lower zone of the seat-tube wall makes touching contact with the first ring-bead of the headrest-support-tube;

providing the punch and die set with a first shoulder, and of locating the first ring-bead in touching contact with the first shoulder;

arranging the punch and die set so as to confine a lower region of the headrest-support-tube below the first shoulder, and, thereby, below the first ring-bead, against radial expansion;

providing the punch and die set with a second shoulder;

arranging the punch and die set so as to confine an upper region of the headrest-support-tube above the second shoulder against radial expansion;

wherein the second shoulder is vertically spaced from the upper zone of the seat-tube wall, the resulting space comprising a second-bead-region of the headrest-support-tube, being the region that lies above and immediately contiguous with the upper zone of the seat-tube wall, and immediately below the second shoulder, whereby the second-bead-region of the headrest-support-tube is free to undergo radial expansion;

bringing the punch and die together, and thereby compressing the headrest-support-tube with enough force whereby the metal of the headrest-support-tube expands outwards, in the second-bead-region thereof, and forms a second ring-bead on the headrest-support-tube;

wherein the arrangement of the punch and die set is such that the second ring-bead lies in direct contact with, and above, the upper zone of the seat-tube wall in the walls-touching-area of the seat-tube, and the first ring-bead lies in direct contact with, and below, the lower zone of the seat-tube wall in the walls-touching-area of the seat-tube;

and then compressing the first ring-bead, the upper zone and the lower zone of the seat-tube wall that form the walls-touching-area, and the second ring-bead, between the first and second shoulders of the punch and die set, and compressing the same tightly enough that, after the seat-tube and the headrest-support-tube are removed from the punch and die set, the walls-touching-area of the seat-tube remains tightly and securely gripped between the first and second ring-beads of the headrest-support-tube.

2. Procedure of claim 1, including forming the first ring-bead by the steps of:

providing a preliminary punch and die set, for applying axial force to the headrest-support-tube, wherein the punch and die thereof are so dimensioned as to confine the tube against radial expansion during axial pressing, except for a recess therein;

compressing the headrest-support-tube axially in the preliminary punch and die set;

whereby the metal of the headrest-support-tube expands into the recess, and forms a first ring-bead on the headrest-support-tube;

and taking the headrest-support-tube out of the preliminary punch and die set.

3. Procedure of claim 1, wherein the procedure includes the step of inserting two of the said headrest-support-tubes into the top rail.

4. Procedure of claim 1, including the step of making the through-hole in the web of a non-round configuration.

5. Procedure for manufacturing an automobile seat with a headrest, including attaching a headrest-support-tube, being of a ductile metal, to an elongate seat-frame-piece comprising a top rail of an automobile seat, by means of the following steps:

attaching the headrest-support-tube into the seat-frame-piece by the procedure of claim 1;

attaching a second headrest-support-tube into the seat-frame-piece, alongside, by the procedure of claim 1;

assembling the seat-frame-piece with the two headrest-support-tubes into an automobile seat;

providing a headrest, the headrest having pegs;

and assembling the pegs of the headrest into the headrest-support-tubes.

6. Procedure of claim 1, wherein the configuration of the upstanding left and right side-zones of the seat-tube wall, in relation to the walls-touching-area of the seat-tube wall, has, as to its cross-section, the form of an I-beam, the left and right side-flanges extending both upwards and downwards, and the web being flat, and symmetrical with respect to the side-flanges.

7. Procedure of claim 1, wherein:

the former is circular, having an axis that intersects, and is perpendicular to, the axis of the seat-tube, whereby the walls-touching area of the seat-tube is correspondingly circular;

and the configuration of the upstanding left and right side-zones of the seat-tube wall, in relation to the walls-touching-area of the seat-tube wall, obtains at a cross-section of the seat-tube taken in the plane that includes the axis of the former, and which is perpendicular to the axis of the seat-tube.

8. Procedure of claim 1, wherein the procedure further includes the step of keeping the seat-tube secured in the punch and die set throughout the two steps of first squeezing the opposed upper and lower zones of the seat-tube wall together, and then of punching the hole right through the walls-touching-area.

9. Procedure of claim 8, wherein the punch and die set includes a hole-punch, for punching the through-hole; and the hole-punch is located co-axially inside the former, and the former is so arranged as to serve as a stripper to assist in withdrawing the hole-punch back out of the through-hole, prior to inserting the headrest-tube in the through-hole.

* * * * *